United States Patent [19]

Eng

[11] 3,961,691

[45] June 8, 1976

[54] EMERGENCY BICYCLE BRAKE

[75] Inventor: Shuck Tong Eng, Corona, N.Y.

[73] Assignee: The Raymond Lee Organization, Inc., a part interest

[22] Filed: Apr. 28, 1975

[21] Appl. No.: 572,180

[52] U.S. Cl. .................................. 188/24; 188/74; 188/167
[51] Int. Cl.² ...................... B62L 1/02; B62L 3/06
[58] Field of Search .................. 188/24, 25, 26, 74, 188/167

[56] References Cited
UNITED STATES PATENTS 3,141,525  7/1964  Lee ........................................ 188/24

FOREIGN PATENTS OR APPLICATIONS 417,907  9/1925  Germany ............................ 188/167

20,439  8/1891  United Kingdom .................. 188/24

Primary Examiner—George E. A. Halvosa

[57] ABSTRACT

A spring-loaded semicircular member is attached to a bicycle frame directly in front of the rear wheel, to press against the wheel when released and thereby stop the wheel's rotation, serving as a brake. A trigger device and a reset device are connected to the member and to each other by conventional flexible bicycle hand brake cable. When the trigger device is operated the reset device is released and the member to be released. To reset the brake, the reset device is operated, causing the member to be pulled forwardly to release the wheel and resetting the trigger device.

2 Claims, 4 Drawing Figures

EMERGENCY BICYCLE BRAKE

SUMMARY OF THE INVENTION

This invention is designed to provide an emergency brake for bicycles, that will stop the rear wheel immediately in the event of an emergency, thus preventing a collision and preventing the bike from rotating about a fixed front wheel and thus overturning the rider.

In this invention, a semicircular member is slidably attached to a bicycle frame directly in front of the rear wheel, so that the member is free to slide back and forth in a horizontal plane. The free ends of the member face rearwardly so that when the member has been slid rearwardly, the inner circumference presses against the rear tire, stopping the rear wheel immediately. The member is attached to a spring that urges it rearwardly, but is normally prevented from moving and kept in its forward most position by lock means. When the lock means is unlocked during an emergency, the member is free to move rearwardly against the tire and stop it immediately. The member may then be pulled forwardly and the lock means relocked after the emergency has been averted.

DETAILED DESCRIPTION OF THE PREFERRED EMBODIMENTS

Figure 1:
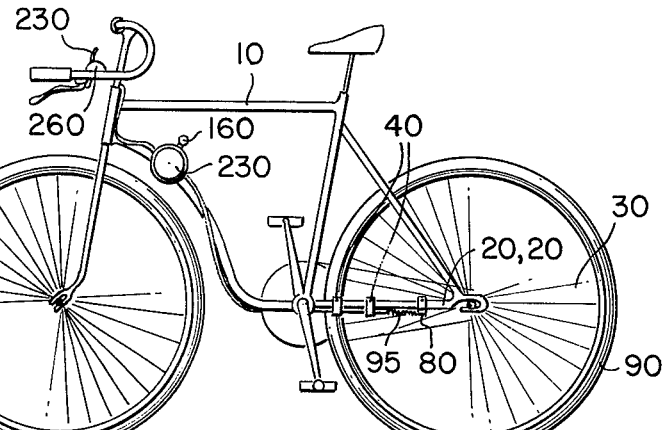
FIG. 1 shows the invention mounted on a bicycle.

A bicyle 10 has two horizontal rearwardly extending tubes 20 extending on either side of the rear wheel 30. Two like guides 40 are clamped around each of the tubes, and have hollow elongated cylinders 50 with open ends that are aligned along rearwardly extending straight lines. Through each pair of these cylinders extends an elongated rod 60 that is connected at its forward end to one of the free ends of a semicircular member 70. Thus, the member is slidably attached to the frame in front of the rear wheel to be free to slide in a horizontal plane. Two clamps 80 are each clamped around a corresponding tube behind the corresponding pair of guides. Two tension springs 95 are each connected between the rear and of one of the rods and the corresponding clamps 80.

Were the member to be left free, the springs would pull it rearwardly against the rear tire 90 to stop it instantly in the event of an emergency. However, the member is normally pulled forwardly against the pull of the springs by a flexible conventional bicycle handbrake cable 100 connected to cable loop 110 by T-fitting 120. The loop is connected to clips 130 at the free ends of the member.

The remote end of cable 100 is wrapped around cylindrical spool 140 that can rotate about an axially extending axle 150. The axle is fixed to the bicycle frame, and is located in an axial bore in the cyclinder.

A lever 160 is attached to the spool to enable it to be manually rotated. Additionally a disc 170 is attached to the spool and lever and rotates with both. The disc has a notch 180 that is normally engaged with a movable part 190. It can be seen that the springs urge the spool to rotate in a clockwise sense, and that such motion is blocked by the pawl as long as the pawl engages the notch.

Normally, torsion spring 200 keeps the pawl rotated fully counterclockwise about pivot 210, and engaged with the notch. However, in an emergency, cable 220 can pull the part clockwise to disengage the part from the disc and allow the spool to rotate clockwise, stopping the rear wheel. After this has been done, lever 160 may be moved counterclockwise to retract the member, free the wheel, and reengage the part. The spool, pawl, disc and lever are enclosed by casing 230 and are referred to collectively as reset means.

Figure 2:
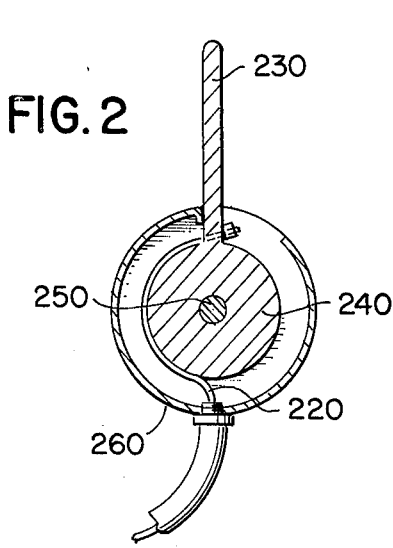
FIG. 2 is a cross-sectional view of the trigger means.
Figure 3:
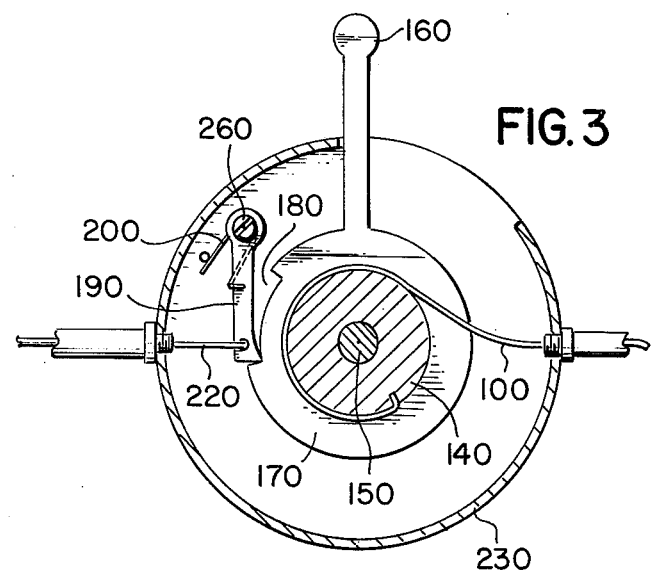
FIG. 3 is a cross-sectional view of the reset means.
Figure 4:
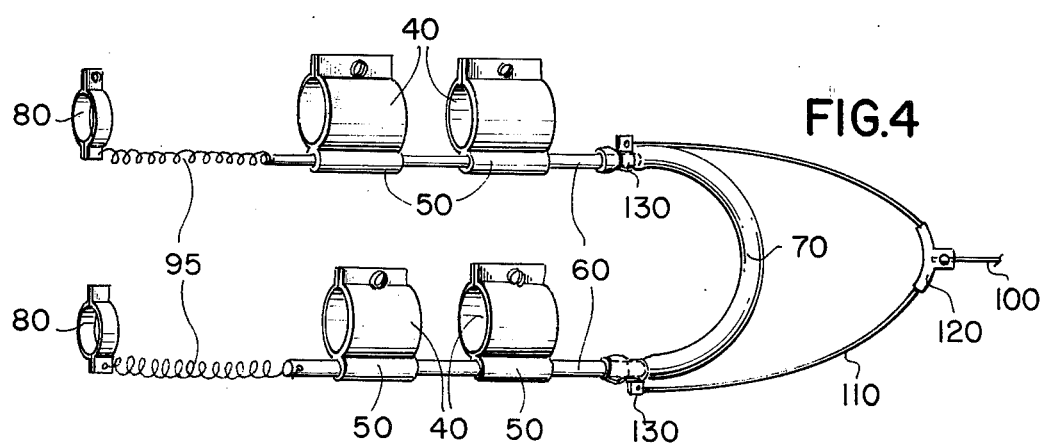
FIG. 4 shows the rear assembly of the invention.

To pull cable 220, the user pulls lever 230 clockwise, wrapping cable 220 around cylindrical spool 240 that rotates about axle 250. Axle 250 extends through an axial bore in spool 240 and is fixed to the bicycle frame. Because the device shown in FIG. 2 "triggers" the reset means, it is referred to as trigger means. The trigger means is also encased in casing 260.

I claim:
1. An emergency brake for bicycles, comprising:
a semicircular member slidably attached to the frame of the bicycle to be slidable forwardly and rearwardly in a horizontal plane, the member being located directly forwardly of the rear wheel with the free ends of the member extending rearwardly:
a spring urging the member rearwardly to press against the rear wheel; and
lock means for holding the member in its forwardmost position when the lock means is locked, and leaving the member free to slide when the lock means is unlocked;
said lock means including a trigger means and a reset means, the reset means allowing the member to be pulled forwardly and locked in its forwardmost position after being released to press against the rear wheel, the trigger means cooperating with the reset means to allow the reset means to release the member when the trigger means is operated, said reset means including a cylindrical spool having an axial bore upon which a cable attached to the member can be wrapped, an axle fixed to the bicycle frame extending through the bore to allow the spool to rotate about its axis, a lever attached to the spool for rotating the spool, a notched disc attached to the spool, and a springloaded movable pawl normally engaging the notch in the disc to prevent the spool's rotation unless the pawl is disengaged; and
a flexible bicycle handbrake cable interconnecting the trigger means, reset means and said member, and wrapped on the spool.

2. The device of claim 1 wherein the trigger means disengages the pawl from the notch when the tirgger means is operated.

* * * * *